United States Patent
Liu et al.

(10) Patent No.: US 11,858,143 B1
(45) Date of Patent: Jan. 2, 2024

(54) SYSTEM FOR IDENTIFYING A USER WITH AN AUTONOMOUS MOBILE DEVICE

(71) Applicant: AMAZON TECHNOLOGIES, INC., Seattle, WA (US)

(72) Inventors: Chi Liu, Mountain View, CA (US); Wei Wang, Sammamish, WA (US); Rajesh Shankarrao Padgilwar, Sunnyvale, CA (US); Ning Zhou, Sammamish, WA (US); Kah Kuen Fu, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 720 days.

(21) Appl. No.: 16/807,060

(22) Filed: Mar. 2, 2020

(51) Int. Cl.
| | |
|---|---|
| *G06V 20/10* | (2022.01) |
| *G06F 18/22* | (2023.01) |
| *G06F 18/2113* | (2023.01) |
| *B25J 9/16* | (2006.01) |
| *G05D 1/00* | (2006.01) |
| *G06N 3/04* | (2023.01) |

(52) U.S. Cl.
CPC .......... *B25J 9/1664* (2013.01); *B25J 9/1697* (2013.01); *G05D 1/0088* (2013.01); *G06F 18/2113* (2023.01); *G06F 18/22* (2023.01); *G06N 3/04* (2013.01); *G06V 20/10* (2022.01)

(58) Field of Classification Search
None
See application file for complete search history.

(56) References Cited

U.S. PATENT DOCUMENTS

| | | | | |
|---|---|---|---|---|
| 2002/0051578 | A1* | 5/2002 | Imagawa | G06V 40/10 |
| | | | | 382/224 |
| 2017/0024877 | A1* | 1/2017 | Versace | G06V 20/10 |
| 2018/0157916 | A1* | 6/2018 | Doumbouya | G06V 10/82 |
| 2018/0260415 | A1* | 9/2018 | Gordo Soldevila | G06V 10/454 |
| 2019/0095946 | A1* | 3/2019 | Azout | G06N 3/045 |
| 2019/0114799 | A1* | 4/2019 | Takahata | G06T 7/70 |
| 2019/0130202 | A1* | 5/2019 | Doumbouya | G06V 40/103 |
| 2019/0311225 | A1* | 10/2019 | Nomoto | G06V 10/761 |

OTHER PUBLICATIONS

Yi et al., "Deep Metric Learning for Practical Person Re-Identification", 2012, Journal of Latex Class Files, vol. 11, No. 4, Dec. 2012, pp. 1-11.*

(Continued)

*Primary Examiner* — Guillermo M Rivera-Martinez
(74) *Attorney, Agent, or Firm* — Lindauer Law, PLLC

(57) ABSTRACT

An autonomous mobile device (AMD) follows a user who may move among other people, change orientation, or move in and out view of a camera on the AMD. A predicted location of the user may be determined based on a previous location and previous movement. A proximity value is determined by the distance between a location in physical space of a user and the predicted location. An image from a camera is processed to determine a user depicted in the image and generate a feature vector (FV) of that depiction. A gallery of FVs of the user as viewed from different angles, poses, and so forth is stored. A similarity value is determined between a FV of an unidentified user in an image and the FVs in the gallery. The user may be identified using the proximity value and the similarity value.

20 Claims, 8 Drawing Sheets

(56) References Cited

OTHER PUBLICATIONS

Luo et al., "End-to-end Active Object Tracking and Its Real-world Deployment via Reinforcement Learning", 2019, arXiv:1808.03405v2 [cs.CV] Feb. 12, 2019, pp. 1-16.*

Li et al.,"DeepReID: Deep Filter Pairing Neural Network for Person Re-identification", 2014, 2014 IEEE Conference on Computer Vision and Pattern Recognition, 2014, pp. 152-159, doi: 10.1109/CVPR.2014.27.*

Montabone et al., "Human detection using a mobile platform and novel features derived from a visual saliency mechanism", 2010, Image and Vision Computing 28 (2010), pp. 391-402.*

Zheng et al., "Person Re-identification: Past, Present and Future", 2015, Journal of Latex Class Files, vol. 14, No. 8, Aug. 2015, pp. 1-20.*

Bak et al., "One-Shot Metric Learning for Person Re-identification," 2017 IEEE Conference on Computer Vision and Pattern Recognition (CVPR), Honolulu, Hi, USA, 2017, pp. 1571-1580, doi: 10.1109/CVPR.2017.171.*

Dong et al., "Secure friend discovery in mobile social networks," 2011 Proceedings IEEE INFOCOM, Shanghai, China, 2011, pp. 1647-1655, doi: 10.1109/INFCOM.2011.5934958.*

Keselman, et al., "Intel R RealSenseTM Stereoscopic Depth Cameras", Intel Corporation, 10 pages.

Li, et al., "Harmonious Attention Network for Person Re-Identification", Queen Mary University of London, Vision Semantics Ltd., 10 pgs.

Sandler, et al., "MobileNetV2: Inverted Residuals and Linear Bottlenecks", Google Inc., Mar. 21, 2019, 14 pgs.

* cited by examiner

SYSTEM FOR IDENTIFYING A USER WITH AN AUTONOMOUS MOBILE DEVICE

A computer program listing appendix is submitted herewith as an ASCII text file named "Appendix_ANSI.txt" created 2 Mar. 2020 with a file size of 45,038 bytes. The material in the file named "Appendix_ANSI.txt" is hereby incorporated by reference in it is entirety.

BACKGROUND

Every day a user faces a variety of tasks both personal and work related that need to be attended to. These may include helping in the care of others such as children or the elderly, taking care of a home, staying in contact with others, and so forth. Devices that can move around a physical space like a home or business may assist in performing these tasks.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
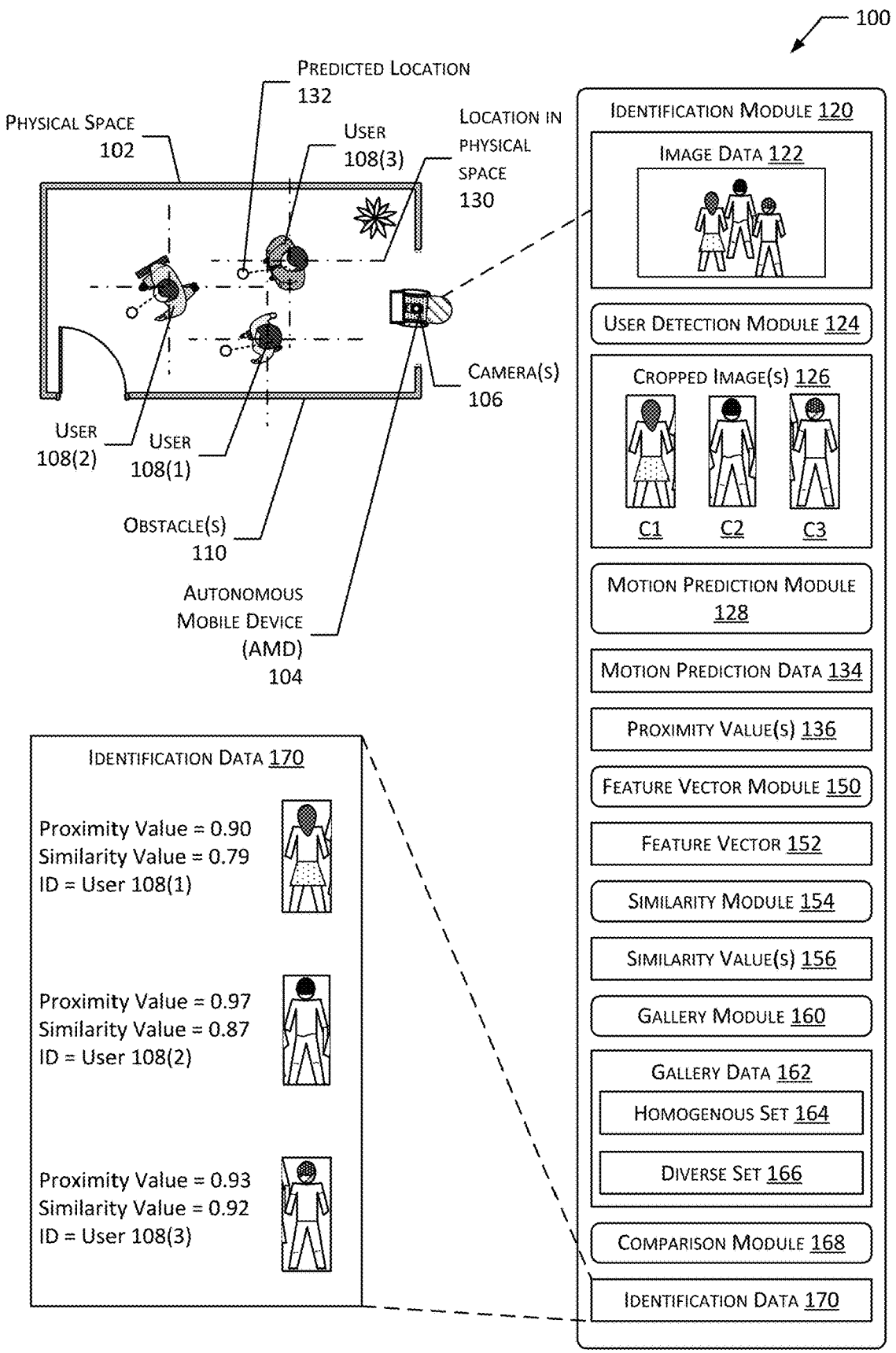
FIG. 1 illustrates a system that includes an autonomous mobile device (AMD) that is able to identify individual users, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement, allowing it to move from one location in a physical space to another without being "driven" or remotely controlled by a user. The AMD may perform tasks that involve moving within the physical space, interacting with users, and so forth. For example, the AMD may be commanded to follow a particular user as that user moves from one room to another. Several tasks, such as following a particular user, involve the identification of a particular user. This identification may be relative, in that the AMD is able to distinguish one person from another.

The interaction between the user, the AMD, and the physical space and obstacles within it is dynamic and complex. For example, the user, the AMD, other users, pets, and so forth may be moving within the physical space. The AMD's view of the user may be obstructed due to obstacles in the physical space. The relative orientation of the user with respect to the AMD may change, presenting different views of the user. The pose of the user may change as they sit, stand, recline, and so forth. As a result, the process of accurately identifying a user is complex.

The process of identifying a particular user may be used in conjunction with other activities, such as moving the AMD in the physical space or responding to a command. This interaction with the real-world means that a low latency determination of the identity of the user is important. For example, when commanded to follow a particular user, the AMD should be able to follow that user without hesitation and without having to stop and determine where the user is in a crowd of people. The resources of an AMD, such as availability of memory, processor, and power are constrained. Due to the complexity of the problem and the limited resources of the AMD, such identification and activities relying on that identification impose significant operational limitations. For example, due to relatively high latencies in identifying the user while following, the speed of the AMD may be limited to a slow crawl. However, this significantly limits the usefulness of the AMD.

Described in this disclosure are systems and techniques for quickly and efficiently identifying a user based on sensor data obtained by the AMD. This identification may be relative, in that the AMD is able to distinguish one person from another. In some implementations the identification may be definitive, associating a particular person with a particular user account.

One or more images of a scene are obtained by one or more cameras of the AMD. For example, a pair of cameras may be operated to provide stereovision and stereopairs of images (a left image and a right image) may be acquired. The images are processed by a user detection module to generate cropped images of people depicted in the image. A predicted location is calculated that indicates where each person is expected to be at a subsequent time. A comparison between the predicted location and a location in physical space at the subsequent time is used to calculate a proximity value. The proximity value indicates how closely the predicted location and the location in physical space agree. For example, if the predicted location for Person1 is within 10 centimeters (cm) of the location in physical space for Person1, the proximity value may be 0.95.

The cropped images are processed to determine a feature vector (FV) that is representative of one or more features of the person depicted in the cropped image. In one implementation, the FV may be generated by processing the cropped image with an artificial neural network. This artificial neural network (ANN) may comprise a backbone of expanded convolutional modules with attention modules incorporated therein. For example, the ANN may combine a backbone of a neural network such as MobileNet v2 (Sandler, Mark, "MobileNetV2: Inverted Residuals and Linear Bottlenecks", arxiv.org/pdf/1801.04381.pdf) with attention modules such as a HACNN inserted into that backbone (Li, Wei, "Harmonious Attention Network for Person Re-Identification", al arxiv.org/pdf/1802.08122.pdf). This arrangement reduces computing requirements for processing and also decreases latency, resulting in FVs being generated more quickly than other methods. In comparison, use of the HACNN alone is precluded due to limited computational resources on the AMD 104 and long latency due to complex local branches.

As images are acquired and processed, the resulting FVs are assessed for similarity to FVs included in gallery data. For example, a similarity value indicates how similar a FV is with respect to another FV in the gallery data. The gallery data comprises FVs associated with particular users. The gallery data for a particular user may be arranged into a homogenous set of FVs and a diverse set of FVs.

The homogenous set of FVs are FVs of that user that have similarity values with respect to one another that are within a first range. For example, the homogenous set of FVs may be associated with images of the user from slightly different views, such as while the user is turning around. The homogenous set may omit storing FVs that are associated with less than a threshold similarity value. This reduces the amount of memory used by not storing FVs that are considered redundant. In one implementation the first range may extend from a similarity value of 0.8 to 0.9.

The diverse set of FVs are FVs of the user that have similarity values with respect to one another that are within a second range. For example, the diverse set of FVs may be associated with images of the user from substantially different views, such as front, left, rear, right, seated, standing, and so forth. The diverse set may omit storing FVs that are associated with less than a threshold similarity value. This reduces the amount of memory used by not storing FVs that are considered redundant. In one implementation the second range may extend from a similarity value of 0.0 to 0.8.

During operation, a FV of an unidentified person depicted in a cropped image is determined. The FV is then compared to the FVs in the gallery data to determine a similarity value. By using gallery data that includes the homogenous set and the diverse set of FVs, the likelihood of an accurate identification is improved. Because the homogenous set provides FVs that are relatively similar to one another, the likelihood of a high similarity value for an image of the same person is increased. Likewise, because the diverse set provides examples of FVs of the same user but in a variety of different appearances, a substantial change in the appearance of the user such as a change in pose or change in relative orientation with respect to the camera is still highly likely to result in a similarity value greater than a threshold value. For example, if the user transitions from walking to seated, a FV of an image of the user seated will have a high similarity value to a previously stored FV associated with the user being seated.

As additional images and resulting FVs are obtained, older entries in the gallery data may be discarded and newer FVs stored. This assures that the gallery data contains current data to facilitate accurate identification of the user.

Identification data that associates a user identifier with a particular person depicted in an image may be determined based on the proximity value and the similarity value. By using both the proximity value and the similarity value, overall accuracy is improved. As described earlier, the proximity value indicates how close the location in physical space of a first person is to a predicted location of a first user. If the first person is very close to the predicted location, it may be considered likely that the first person is the first user. If the similarity value of the FV of the image of the first person as compared to a previously stored FV in the gallery data exceeds a threshold value, it may also be considered likely that the first person is the first user. By combining both the proximity and the similarity, the overall likelihood of accurate identification is improved.

Further reductions in latency and the computing resources used to determine the identification data are also possible. In one implementation, the proximity value may be used to selectively search the gallery data. For example, the gallery data for the user having a predicted location closest to the unidentified person may be processed first to determine similarity values.

By using the techniques described, the AMD is able to quickly and accurately identify a user. This allows the AMD to perform tasks that use identification, such as finding or following a particular user in the physical space. As a result of these techniques, the operation of the AMD within the physical space is significantly improved.

Illustrative System

FIG. 1 illustrates a system 100 in which a physical space 102 includes an autonomous mobile device (AMD) 104, according to some implementations. The AMD 104 may include sensors, such as one or more cameras 106. The physical space 102 may include one or more users 108.

One or more obstacles 110 may be present within the physical space 102. For example, obstacles 110 may comprise walls, furnishings, stairwells, people, pets, and so forth. These obstacles 110 may occlude a view, by the sensors on the AMD 104, of the user 108. For example, the user 108(2) may move through a doorway and a wall may prevent the camera 106 from seeing the user 108 in the other room.

The AMD 104 may use an identification module 120 to determine identification data. For example, the identification data may associate a particular user identifier with a particular person depicted in an image acquired by the camera 106. In one implementation, the identification data may be relative. For example, the identification data may distinguish one person from another. In another implementation, the identification data may be absolute, such as identifying user 108(2) as "John Smith."

The identification module 120 accepts as input sensor data from one or more sensors on or associated with the AMD 104. For example, the camera(s) 106 on the AMD 104 may generate image data 122. This image data 122 may comprise single images, stereopairs of images, and so forth.

A user detection module 124 processes the image data 122 and generates cropped images 126. For example, the user detection module 124 may use a first artificial neural network to determine portions of the image data 122 that are likely to include a person. In one implementation, the cropped image(s) 126 may comprise the image data 122 with data indicative of a bounding box designating a portion of the image data 122 that is deemed likely to depict a person. In another implementation, the cropped image(s) 126 may comprise a subset of the data from the image data 122. In some implementations the cropped image(s) 126 may be resized and rescaled to predetermined values. In some implementations, an internal identifier may be associated with the person in the cropped image 126.

A motion prediction module 128 determines a location in physical space 130 and motion prediction data 134 indicative of a predicted location 132 of a person at a given time. In one implementation, the motion prediction module 128 may determine the location in physical space 130 of the person using the image data 122. For example, a pair of cameras 106 may provide stereovision. Based on the disparity in apparent position of the user in a left image acquired from a left camera 106(L) and a right image acquired from a right camera 106(R), a location in the physical space 102 of the person may be determined relative to the cameras 106. A set of locations in physical space 130 may be determined during some interval of time. Based on the set of locations in physical space 130, a direction and velocity of movement of the person may be determined. For example, a Kalman filter may use the set of locations in physical space 130 to determine the predicted location 132.

In other implementations other techniques may be used to determine the motion prediction data 134. For example, an ultrasonic sensor, lidar, depth camera, or other device may provide information about the location in physical space 130 and apparent motion of the person at a given time interval. This information may be used to determine the predicted location 132.

The motion prediction data 134 may be used to determine one or more proximity values 136. A proximity value 136 may indicate how closely a predicted location 132 of a user 108 at a specified time corresponds to a location in physical space 130 of a person at the specified time. For example, a proximity value 136 may indicate that the location in physical space 130 of Person1 at time=2 is within 5 cm of the predicted location 132 of the user 108(3). The proximity value 136 may be expressed as a distance, ratio, and so forth. The proximity value 136 may be specific to a particular combination of unidentified person and user 108. For example, a first proximity value 136 may describe how closely the location in physical space 130 of Person1 at time=2 is to the predicted location 132 of the user 108(3), while a second proximity value 136 may describe how closely the location in physical space 130 of Person1 at time=2 is to the predicted location 132 of the user 108(2).

A feature vector module 150 accepts as input a cropped image 126 and produces as output a feature vector (FV) 152. The feature vectors 152 are representative of features in the cropped image 126. The feature vector module 150 may comprise a second artificial neural network (ANN) that has been trained to generate feature vectors 152. The second ANN may comprise a backbone of expanded convolutional modules with attention modules incorporated therein. For example, the ANN may combine a backbone of a neural network such as MobileNet v2 (Sandler, Mark, "MobileNetV2: Inverted Residuals and Linear Bottlenecks", arxiv.org/pdf/1801.04381.pdf) with attention modules such as a HACNN (Li, Wei, "Harmonious Attention Network for Person Re-Identification", al arxiv.org/pdf/1802.08122.pdf). The second ANN is discussed in more detail with regard to FIGS. 3 and 4.

A similarity module 154 determines a similarity value 156 that is indicative of similarity between two or more FVs 152. In one implementation, the similarity value 156 may be calculated as a Manhattan distance in vector space. In other implementations other techniques may be used to determine the similarity value 156. For example, the similarity value 156 may be based on a Euclidian distance between two FVs 152.

A gallery module 160 maintains gallery data 162 for one or more users 108. The gallery data 162 comprises one or more FVs 152 that are associated with a user 108. The gallery data 162 may maintain a homogenous set 164 of FVs 152 and a diverse set 166 of FVs 152. In some implementations a separate set of gallery data 162 may be maintained for each user 108. The gallery data 162 may include data associated with a face, entire body, portion of a body, and so forth. In other implementations the gallery data 162 may include data associated with autonomous devices, pets, and so forth.

The homogenous set 164 of FVs 152 are FVs 152 of that user 108 that have similarity values 156 with respect to one another that are within a first range. For example, the homogenous set 164 of FVs 152 may be associated with images of the first user 108 from slightly different views, such as while the user 108 is turning around. In one implementation the homogenous set 164 may include FVs 152 having a similarity value 156 of 0.8 to 0.9. The homogenous set 164 may omit storing FVs 152 that are associated with greater than a threshold similarity value 156. For example, FVs 152 having a similarity value of greater than 0.9 may be discarded. This reduces the amount of memory used by not storing FVs 152 that are considered redundant.

The diverse set 166 of FVs 152 are FVs 152 of the user 108 that have similarity values 156 with respect to one another that are within a second range. For example, the diverse set 166 of FVs 152 may be associated with images of the first user 108 from substantially different views, such as front, left, rear, right, seated, standing, and so forth. In one implementation the diverse set 166 may include FVs 152 having a similarity value 156 of less than 0.8. The diverse set 166 may omit storing FVs 152 that are associated with less than a threshold similarity value 156. As above, this reduces the amount of memory used by not storing FVs 152 that are considered redundant. The gallery data 162 is discussed in more detail with regard to FIG. 2.

A comparison module 168 determines identification data 170 for a person depicted in the cropped image 126. The comparison module 168 may use one or more proximity values 136 and one or more similarity values 156 to determine the identification data 170. For example, a set of proximity values 136 for a second time may be determined. The largest proximity value 136 and associated user 108(1) from that set may be determined. Continuing the example, the similarity module 154 may generate a set of similarity values 156 indicative of a comparison of the FV 152 from the cropped image 126 acquired at the second time to previously stored FVs 152 in the gallery data 162. The largest similarity value 156 and associated user 108(1) from that set may be determined. If a same user 108(1) is associated with the largest proximity value 136 and the largest similarity value 156, the person depicted in the cropped image 126 acquired at the second time may be asserted to be the user 108(1). The comparison module 168 may then generate identification data 170 that indicates user 108(1) is at the location in physical space 130 at the second time.

In other implementations, the comparison module 168 may use other techniques to determine the identification data 170. For example, the proximity values 136 and the similarity values 156 may be normalized and summed to determine an overall comparison value. The combination of a particular proximity value 136 and similarity value 156 having the greatest overall comparison value may be deemed to identify the user 108 depicted in the cropped image 126.

Figure 2:
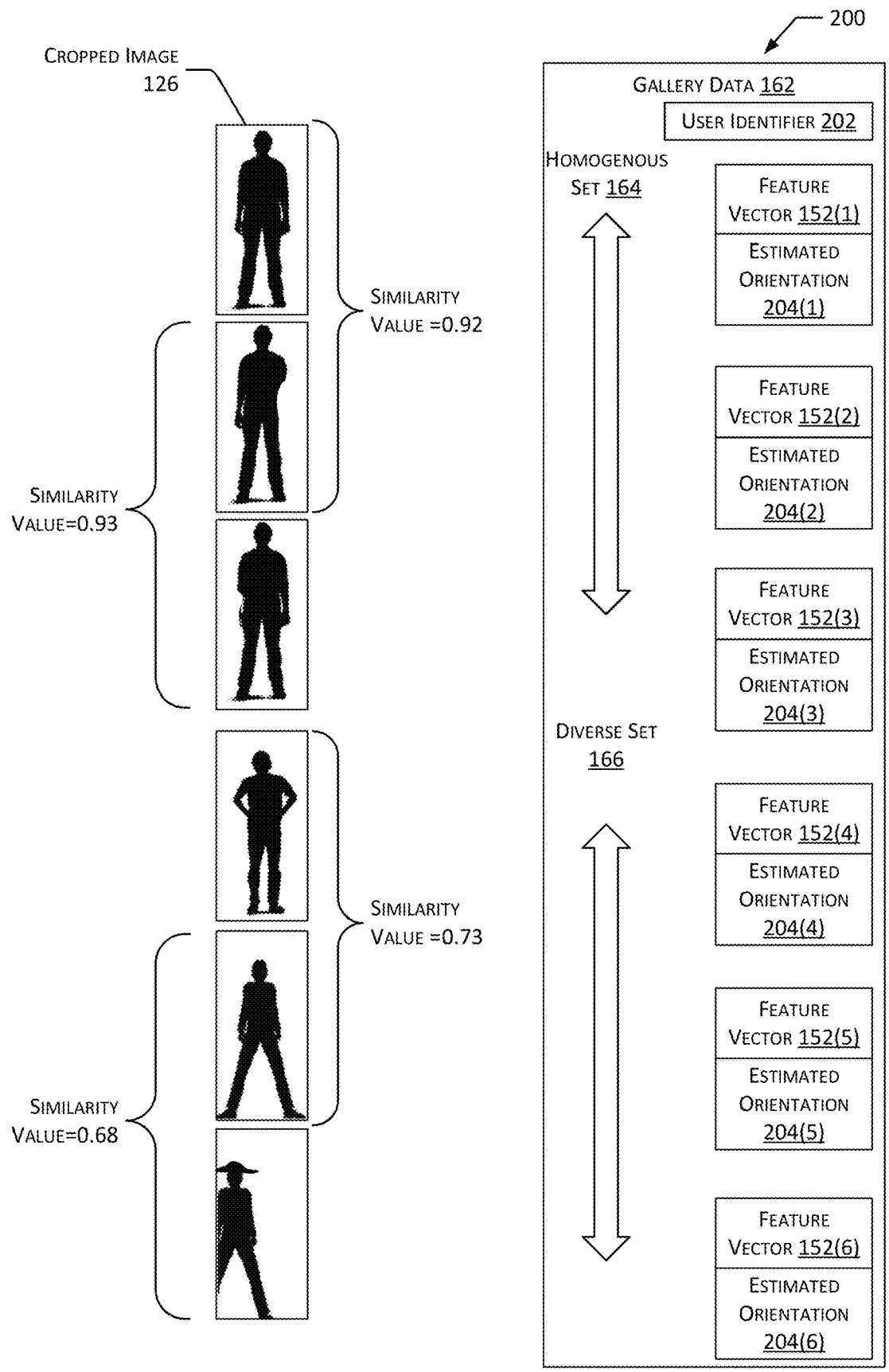
FIG. 2 illustrates gallery data that may be used to identify users, according to some implementations.

FIG. 2 illustrates a situation 200 in which gallery data 162 is used for identifying users 108, according to some implementations. As cropped images 126 are processed by the feature vector module 150, the resulting FVs 152 may be assessed by the gallery module 160 to determine whether those resulting FVs 152 will be included in gallery data 162. The FVs 152 included in the gallery data 162 are associated with a particular user identifier 202. For example, a set of gallery data 162 may comprise a set of FVs 152 that are associated with a single user identifier 202.

Several cropped images 126 are shown with their corresponding FVs 152 and relative similarity values 156 between pairs of FVs 152. A candidate FV 152 is processed by the similarity module 154 to determine similarity values 156 of that candidate FV 152 to previously stored FVs 152 in the gallery data 162. If the candidate FV 152 exhibits a similarity value 156 with any previously stored FV 152 that is greater than a first threshold, that candidate FV 152 is disregarded and would not be included in the gallery data 162. For example, the discarded candidate FV 152 is deemed redundant with respect to the existing FVs 152 included in the gallery data 162. If the candidate FV 152 exhibits a similarity value 156 that is within a first range, the candidate FV 152 may be included in the gallery data 162 within the homogenous set 164. If the candidate FV 152 exhibits a similarity value 156 that is within a second range (exclusive of the first range), the candidate FV 152 may be included in the gallery data 162 within the diverse set 166.

In some implementations the gallery data 162 may include additional information. For example, the gallery data 162 may include orientation data indicative of an estimated orientation 204 of the user 108. The estimated orientation 204 may be indicative of an estimated orientation of the user 108 relative to the camera 106. For example, if the user 108 is directly facing the camera 106 in the image data 122, the estimated orientation 204 may be 0 degrees. Continuing the example, if the user 108 is facing away from the camera 106 such that the back of their head and shoulders are in the image data 122, the estimated orientation 204 may be 180 degrees.

In one implementation the estimated orientation 204 may be determined using a trained ANN. In another implementation, one or more keypoints on the user 108 may be determined in the cropped images 126. For example, keypoints may comprise left shoulder, right shoulder, face, and so forth. Based on the relative positioning of the keypoints in the image data 122, the estimated orientation 204 may be determined.

In some implementations, operation of the similarity module 154 may use the estimated orientation 204. For example, an estimated orientation 204 of a person in the cropped image 126 may be determined. Subsequently, the similarity module 154 may generate similarity values 156 for those FVs 152 that are within a threshold range of the estimated orientation 204.

Figure 7:
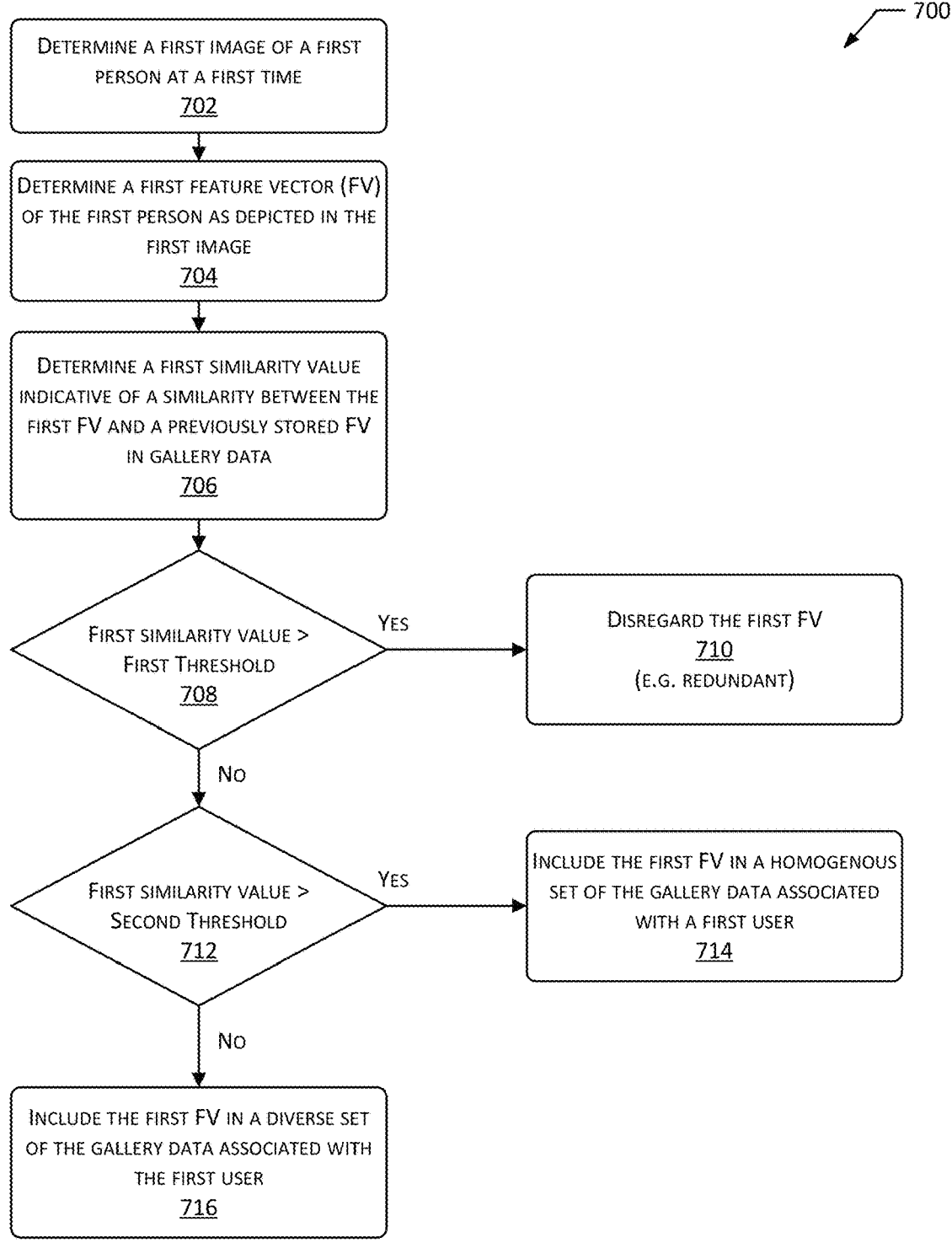
FIG. 7 is a flow diagram of a process for generating gallery data, according to some implementations.

The process of determining whether to include a candidate FV 152 in the gallery data 162 is described in more detail with regard to FIG. 7.

Figure 3:
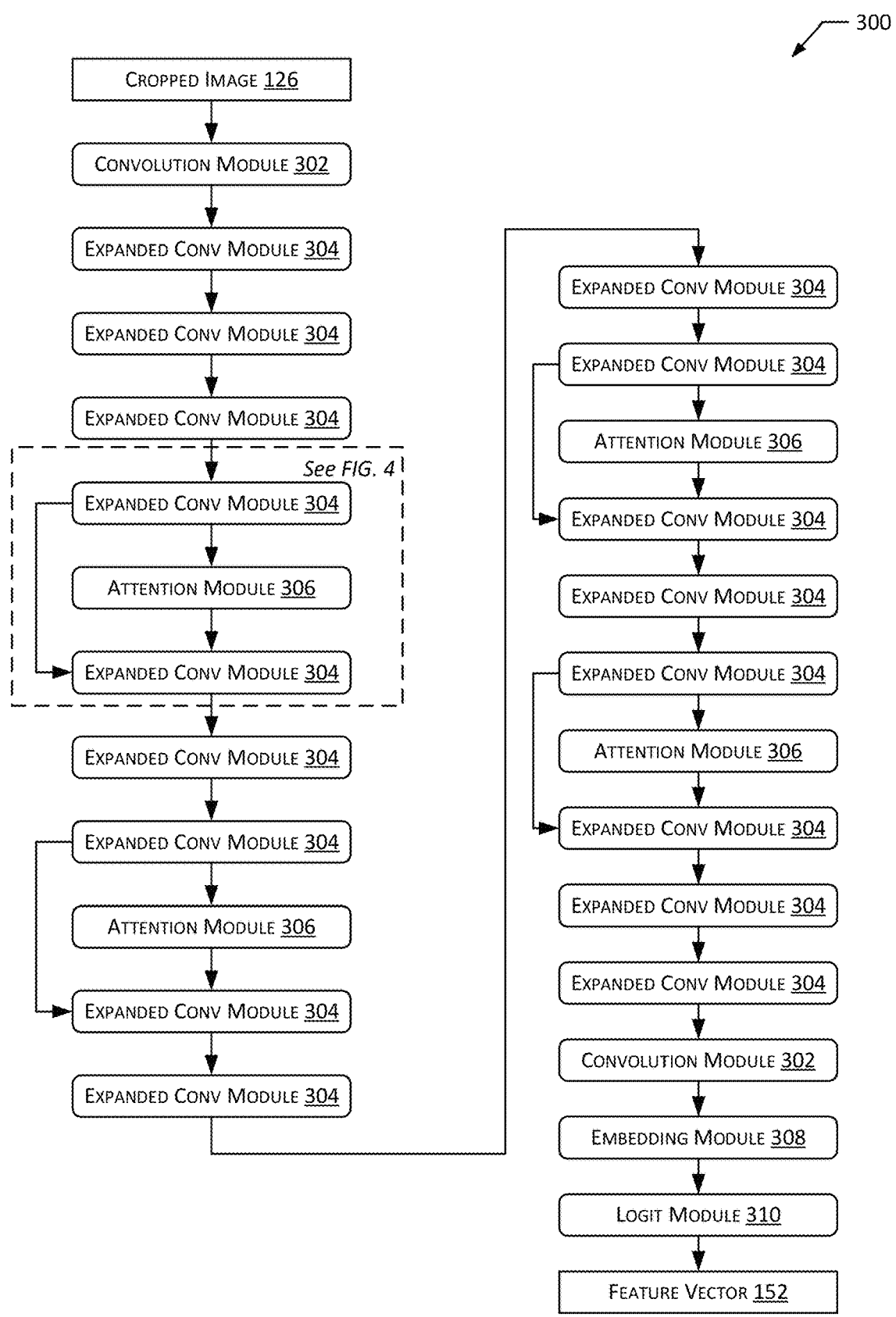
FIG. 3 depicts a block diagram of a neural network to generate feature vectors representative of features of a person depicted in an image, according to some implementations.

FIG. 3 depicts a block diagram 300 of an artificial neural network (ANN) to generate the FVs 152 representative of features of a person depicted in an image, according to some implementations. The feature vector module 150 may use the ANN described herein to generate the FVs 152.

As depicted here, the architecture of the ANN may comprise a backbone of expanded convolutional modules with attention modules incorporated therein. For example, the ANN may use a backbone of a neural network such as MobileNet v2 (Sandler, Mark, "MobileNetV2: Inverted Residuals and Linear Bottlenecks", arxiv.org/pdf/1801.04381.pdf) into which attention modules such as a HACNN (Li, Wei, "Harmonious Attention Network for Person Re-Identification", al arxiv.org/pdf/1802.08122.pdf) have been integrated.

The backbone may comprise convolution modules 302 and expanded convolution modules 304 as described with regard to the MobileNet v2 architecture. The convolution modules 302 comprise a residual convolution block while the expanded convolution module 304 provides depth and spatial decoupling. This provides a depth-wise convolution that reduces processing time while retaining accuracy. The residual block nature of the MobileNet v2 architecture facilitates retention during processing of features with less feature fading.

The attention modules 306 are included into the backbone. In this illustration, four attention modules 306 are shown. The attention modules 306 operate to provide a weight map that emphasizes the features of the person in the foreground while deemphasizing features in the background. The attention module 306 may employ at least two kinds of attention. Spatial attention attempts to suppress background features and emphasize foreground features with respect to the physical space. In comparison, channel attention attempts to suppress features that not likely to be associated with the person, while emphasizing features that are likely associated with the person. As a crude example, spatial attention uses where in physical space something is to try and determine if it is in the foreground and should be considered. In comparison, channel attention determines if something looks like a background and should be disregarded.

In addition to passing data from the expanded convolution module 304 to the attention module 306, residual data is provided to the expanded convolution module 304 that is after the attention module 306. For example, the attention module 306 may comprise a "harmonious attention module". (See Li, Wei, "Harmonious Attention Network for Person Re-Identification", al arxiv.org/pdf/1802.08122.pdf). In the implementation depicted here, the attention modules 306 may be inserted after the 5th, 8th, 12th, and 15$^{th}$ expanded convolution modules 304 of the MobileNet v2 architecture. In other implementations, the attention modules 306 may be used elsewhere within the backbone. By using this architecture, an overall improvement in accuracy of identification of approximately 5% was observed during testing. The attention modules 306 are discussed in more detail with regard to FIG. 4.

Figure 4:
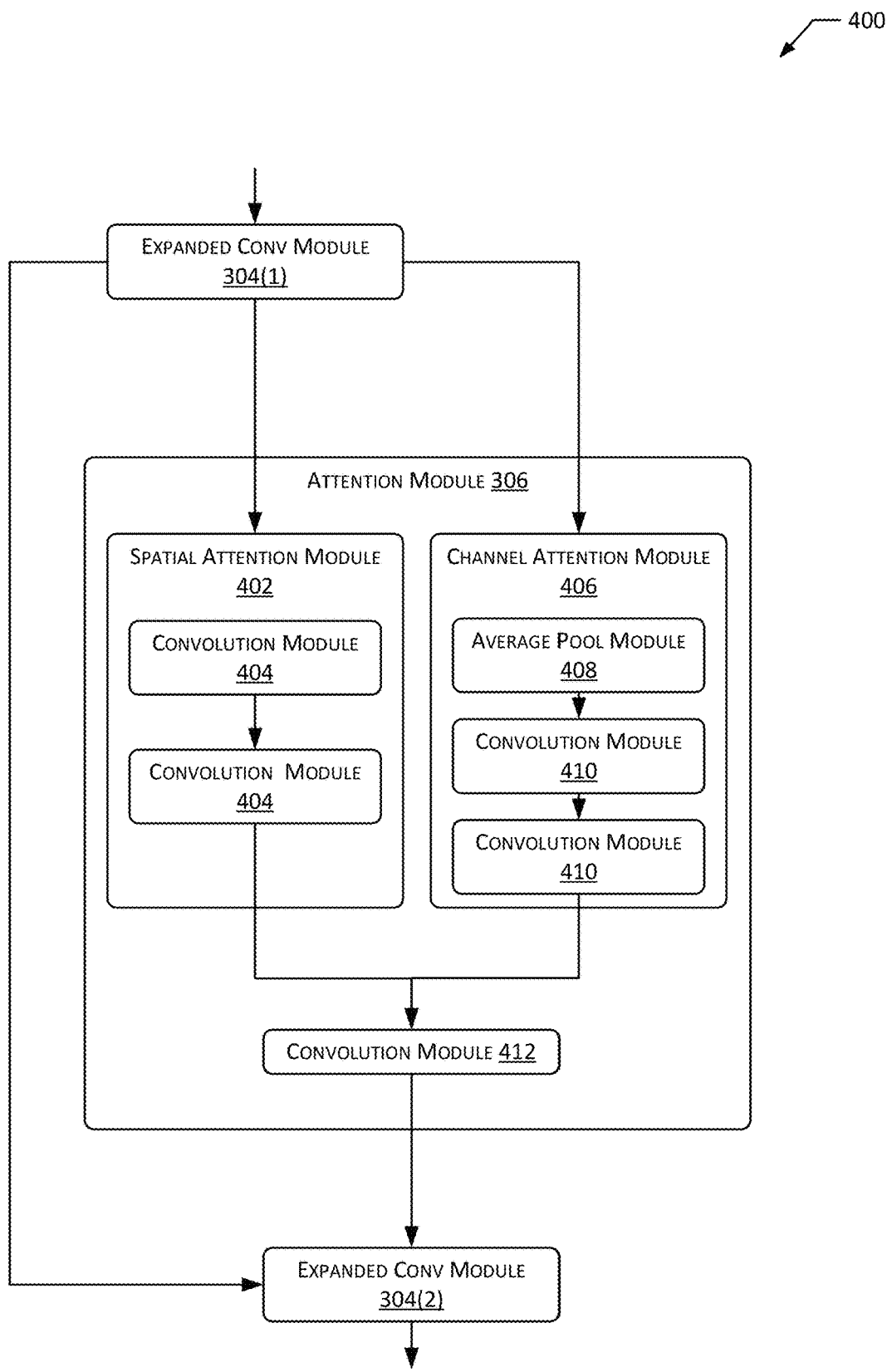
FIG. 4 depicts a block diagram of an attention module of the neural network of FIG. 3, according to some implementations.

FIG. 4 depicts a block diagram 400 of an attention module 306 of the neural network of FIG. 3, according to some implementations. The output from the expanded convolution module 304(1), such as a feature cube, is provided as input to the attention module 306. The attention module 306 uses a spatial attention algorithm and a channel attention algorithm to produce output data such as a feature weight map. Each attention module 306 comprises a spatial attention module 402 that implements the spatial attention algorithm and a channel attention module 406 that implements the channel attention algorithm.

The spatial attention module 402 comprises a plurality of convolution modules 404. In one implementation, the spatial attention module 402 may comprise a first convolution module 404 and a second convolution module 404 that operate in series to regress the input to a first output data. The spatial attention module 402 may determine a first feature weight map indicative of weights associated with portions of the input, with the weight indicating a likelihood that those portions contain useful detail. It may be conceptualized that the first feature weight map indicates which pixels in the data should be considered most important. The values in the first feature weight map may be between 0 and 1.

Additional modules may be present in the spatial attention module 402. For example, the spatial attention module 402 may include a reduce mean module, the two convolution modules 404, and a resize module. Input to the spatial attention module 402 may comprise a feature cube "F5" provided from the expanded convolution module 304 and may have a size as indicated by [Batch×Height×Width×Channel]=[1×32×16×32], and a spatial size is [H, W]=[32×16]. The spatial attention module 402 takes F5 as input, the reduce mean module determines an average one of the channels, then the output is passed through the two convolution modules 404. As a result, the feature cube changes as [1×32×16×32], [1×32×16×1], [1×16×8×1], [1×32×16×1], and [1×32×16×1]. In this example, the final output of the spatial attention module 402 is a 1 channel map of the same size as the feature cube.

The channel attention module 406 accepts the output, such as the feature cube, from the preceding expanded convolution module 304 which is provided as input to the channel attention module 406, and generates second output data. The channel attention algorithm implemented by the channel attention module 406 may determine a second feature weight map indicative of weights associated with channels of the input. It may be conceptualized that the second feature weight map indicates which channels should be considered most important. The values in the first feature weight map may be between 0 and 1.

The channel attention module 406 comprises an average pool module 408 to perform a pooling function on the input. A feature cube is provided as input to the average pool module 408. The feature cube may comprise a weight vector of the same length as the number of channels. Output from the average pool module 408 is connected to a first convolution module 410. Output from the first convolution module 410 is provided as input to a second convolution module 410. The second convolution module 410 generates the second output data. The second output data may comprise an attention cube having the same dimensions as the feature cube. For example, the feature cube "F5" from the expanded convolution module 304 may be provided as input to the average pool module 408. The feature cube is of size [Batch×Height×Width×Channel]=[1×32×16×32]. As a result, the feature cube changes as [1×32×16×32], [1×1×1×32], [1×1×1×2], and [1×1×1×32]. The output of the channel attention module 406 thus comprises a weight vector of the same length as the number of channels.

The first output data and the second output data are provided as input to a convolution module 412 that generates third output data. The third output data is provided as input to the subsequent expanded convolution module 304(2). In one implementation, the convolution module 412 may process the first feature weight map and the second feature weight map to generate a third feature weight map. For example, the third feature weight map may comprise a saliency weight map. The subsequent expanded convolution module 304(2) may also accept as input at least a portion of the output from the prior expanded convolution module 304(1).

The neural network described with regard to FIGS. 3 and 4 is also referred to as "HAMNET". One implementation of HAMNET is described in the computer program listing appendix that is submitted herewith. This computer program listing is expressed in the Python programming language as promulgated by the Python Software Foundation at python.org and using the TensorFlow environment as described in Martin Abadi, et al, "TensorFlow: Large-scale machine learning on heterogeneous systems," 2015 and promulgated at tensorflow.org.

In some implementations, parameters of the attention modules 306 may be modified based on the position within the backbone of the architecture. For example, for a second attention module 306, the input data is of size [1×16×8×64], and the weight map provided as output has the same dimensionality.

The neural network used to generate the feature vectors 152 may be trained using standard cross-entropy loss and triplet loss. Images from the same person may be treated as one class, so cross-entropy loss enforces correct recognition of different people into different classes. Triplet loss measures the pairwise distance between different people, and penalizes a pairwise distance that is less than a threshold. The triplet loss enforces that a distance in vector space between feature vectors 152 of different people will be greater than a predefined threshold.

Figure 5:
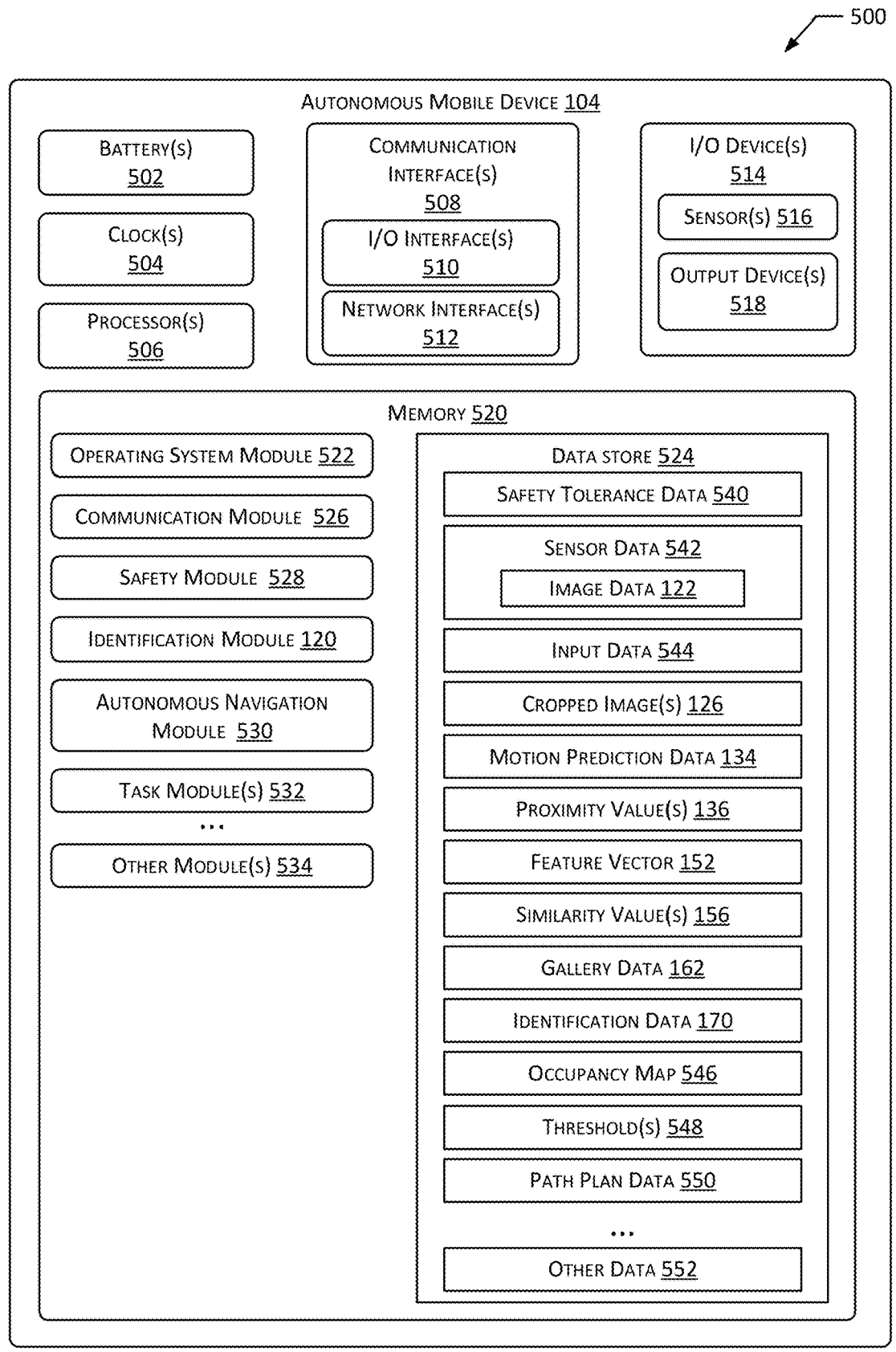
FIG. 5 is a block diagram of the components of the AMD, according to some implementations.

FIG. 5 is a block diagram 500 of the AMD 104, according to some implementations. The AMD 104 may include one or more batteries 502 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 504 may provide information indicative of date, time, ticks, and so forth. For example, a processor 506 may use data from the clock 504 to associate a particular time with an action, control operation of the lights, display device, the sensor data 542, and so forth.

The AMD 104 may include one or more hardware processors 506 (processors) configured to execute one or more stored instructions. The processors 506 may comprise one or more cores. The processors 506 may include microcontrollers, systems on a chip, field programmable gate arrays, digital signal processors, graphic processing units, general processing units, and so forth.

The AMD 104 may include one or more communication interfaces 508 such as input/output (I/O) interfaces 510, network interfaces 512, and so forth. The communication interfaces 508 enable the AMD 104, or components thereof, to communicate with other devices or components. The communication interfaces 508 may include one or more I/O interfaces 510. The I/O interfaces 510 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 510 may couple to one or more I/O devices 514. The I/O devices 514 may include input devices such as one or more of a sensor 516, keyboard, mouse, scanner, and so forth. The I/O devices 514 may also include output devices 518 such as one or more of a motor, speaker, display device, printer, and so forth. I/O devices 514 are described in more detail with regard to FIG. 6. In some embodiments, the I/O devices 514 may be physically incorporated with the AMD 104 or may be externally placed.

The network interfaces 512 may be configured to provide communications between the AMD 104 and other devices such as other AMDs 104, docking stations, routers, access points, and so forth. The network interfaces 512 may include devices configured to couple to personal area networks (PANs), local area networks (LANs), wireless local area networks (WLANS), wide area networks (WANs), and so forth. For example, the network interfaces 512 may include devices compatible with Ethernet, Wi-Fi, Bluetooth, Bluetooth Low Energy, ZigBee, and so forth. The AMD 104 may also include one or more busses or other internal communications hardware or software that allow for the transfer of data between the various modules and components of the AMD 104.

As shown in FIG. 5, the AMD 104 includes one or more memories 520. The memory 520 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 520 provides storage of computer-readable instructions, data structures, program modules, and other data for the operation of the AMD 104. A few example functional modules are shown stored in the memory 520, although the same functionality may alternatively be implemented in hardware, firmware, or as a system on a chip (SoC).

The memory 520 may include at least one operating system (OS) module 522. The OS module 522 is configured to manage hardware resource devices such as the I/O interfaces 510, the I/O devices 514, the communication interfaces 508, and provide various services to applications or modules executing on the processors 506. The OS module 522 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the AMD Operating System (ROS) as promulgated at www.ros.org, and so forth.

Also stored in the memory 520 may be a data store 524 and one or more of the following modules. These modules may be executed as foreground applications, background tasks, daemons, and so forth. The data store 524 may use a flat file, database, linked list, tree, executable code, script, or other data structure to store information. In some implementations, the data store 524 or a portion of the data store 524 may be distributed across one or more other devices including other AMDs 104, servers, network attached storage devices, and so forth.

A communication module 526 may be configured to establish communication with other devices, such as other AMDs 104, an external server, a docking station, and so forth. The communications may be authenticated, encrypted, and so forth.

Other modules within the memory 520 may include a safety module 528, the identification module 120, an autonomous navigation module 530, one or more task modules 532, or other modules 534.

The modules may use data stored within the data store 524, including safety tolerance data 540, sensor data 542 including the image data 122, input data 544, the cropped image(s) 126, the motion prediction data 134, the proximity values 136, the feature vectors 152, similarity values 156, the gallery data 162, identification data 170, an occupancy map 546, thresholds 548, path plan data 550, other data 552, and so forth.

The safety module 528 may access the safety tolerance data 540 to determine within what tolerances the AMD 104 may operate safely within the physical space 102. For example, the safety module 528 may be configured to reduce the speed at which the AMD 104 moves as it approaches an obstacle 110. In another example, the safety module 528 may access safety tolerance data 540 that specifies a minimum distance from a person that the AMD 104 is to maintain. Movement of the AMD 104 may be stopped by one or more of inhibiting operations of one or more of the motors, issuing a command to stop motor operation, disconnecting power from one or more of the motors, and so forth. The safety module 528 may be implemented as hardware, software, or a combination thereof.

The autonomous navigation module 530 provides the AMD 104 with the ability to navigate within the physical space 102 without real-time human interaction. The autonomous navigation module 530 may implement, or operate in conjunction with, a mapping module to determine an occupancy map 546, a navigation map, or other representation of the physical space 102. In one implementation, the mapping module 530 may use one or more simultaneous localization and mapping ("SLAM") techniques. The SLAM algorithms may utilize one or more of maps, algorithms, beacons, or other techniques to navigate. The autonomous navigation module 530 may use the navigation map to determine a set of possible paths along which the AMD 104 may move. One of these may be selected and used to determine path plan data 550 indicative of a path. For example, a possible path that is the shortest or has the fewest turns may be selected and used to determine the path. The path is then subsequently used to determine a set of commands that drive the motors connected to the wheels. For example, the autonomous navigation module 530 may determine the current location within the physical space 102 and determine path plan data 550 that describes the path to a destination location such as the docking station.

The autonomous navigation module 530 may utilize various techniques during processing of sensor data 542. For example, image data 122 obtained from cameras 106 on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 506, in response to a command received from one or more communication interfaces 508, as determined from the sensor data 542, and so forth. For example, an external server may send a command that is received using the network interface 512. This command may direct the AMD 104 to proceed to find a particular user 108, follow a particular user 108, and so forth. The AMD 104 may then process this command and use the autonomous navigation module 530 to determine the directions and distances associated with carrying out the command. For example, the command to "come here" may result in a task module 532 sending a command to the autonomous navigation module 530 to move the AMD 104 to a particular location near the user 108 and orient the AMD 104 in a particular direction.

The AMD 104 may connect to a network using one or more of the network interfaces 512. In some implementations, one or more of the modules or other functions described here may execute on the processors 506 of the AMD 104, on the server, or a combination thereof. For example, one or more servers may provide various functions, such as automated speech recognition (ASR), natural language understanding (NLU), providing content such as audio or video to the AMD 104, and so forth.

The other modules 534 may provide other functionality, such as object recognition, speech synthesis, user identification, and so forth. The other modules 534 may comprise a speech synthesis module that is able to convert text data to human speech. For example, the speech synthesis module may be used by the AMD 104 to provide speech that a user 108 is able to understand.

The data store 524 may store the other data 552 as well. For example, localization settings may indicate local preferences such as language, user identifier data may be stored that allows for identification of a particular user 108, and so forth.

Figure 6:
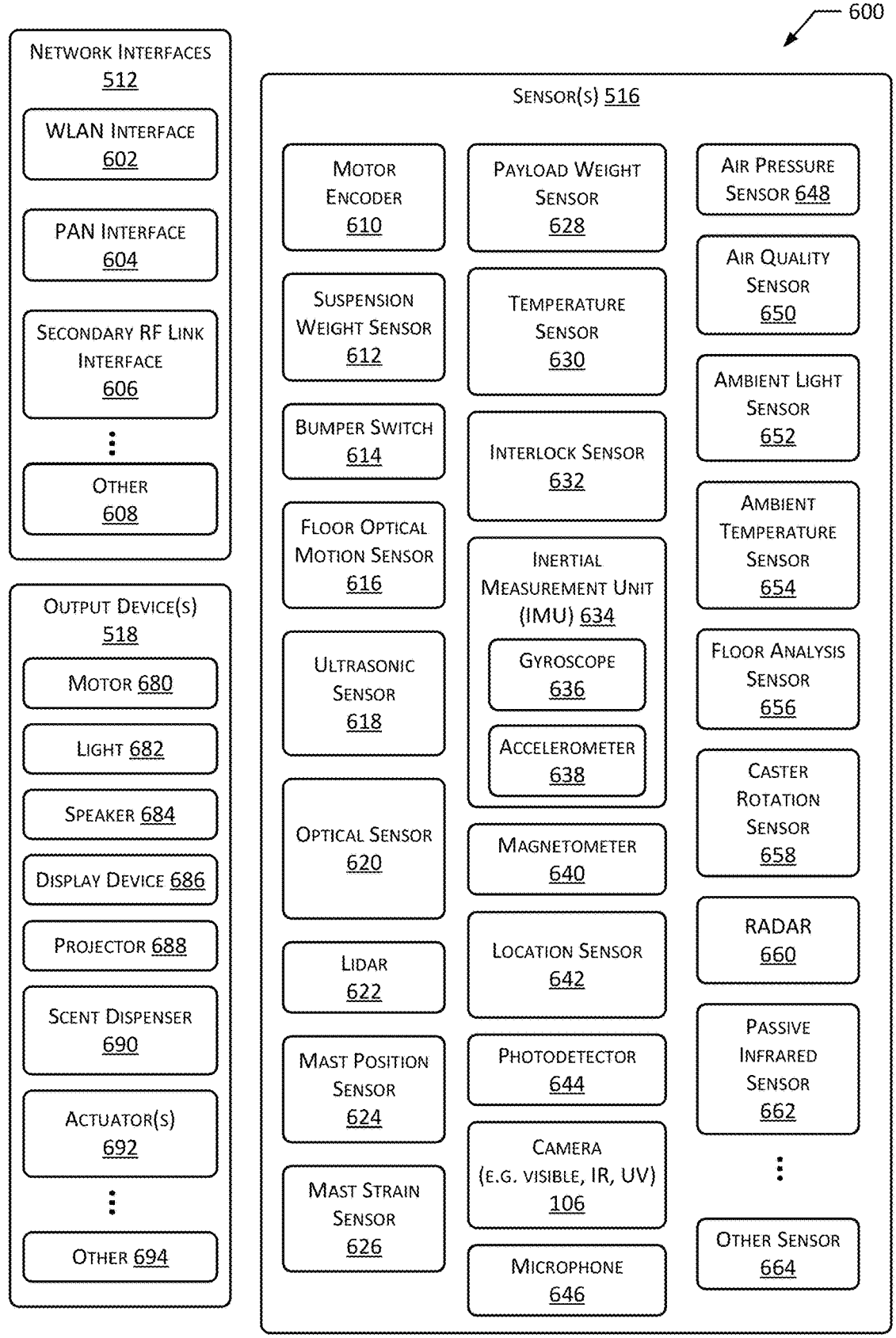
FIG. 6 is a block diagram of some components of the AMD, such as network interfaces, sensors, and output devices, according to some implementations.

FIG. 6 is a block diagram 600 of some components of the AMD 104 such as network interfaces 512, sensors 516, and output devices 518, according to some implementations. The components illustrated here are provided by way of illustration and not necessarily as a limitation. For example, the AMD 104 may utilize a subset of the particular network interfaces 512, output devices 518, or sensors 516 depicted here, or may utilize components not pictured. One or more of the sensors 516, output devices 518, or a combination thereof may be included on a moveable component that may be panned, tilted, rotated, or any combination thereof with respect to a chassis of the AMD 104.

The network interfaces 512 may include one or more of a WLAN interface 602, PAN interface 604, secondary radio frequency (RF) link interface 606, or other 608 interface. The WLAN interface 602 may be compliant with at least a portion of the Wi-Fi specification. For example, the WLAN interface 602 may be compliant with at least a portion of the IEEE 802.11 specification as promulgated by the Institute of Electrical and Electronics Engineers (IEEE). The PAN interface 604 may be compliant with at least a portion of one or more of the Bluetooth, wireless USB, Z-Wave, ZigBee, or other standards. For example, the PAN interface 604 may be compliant with the Bluetooth Low Energy (BLE) specification.

The secondary RF link interface 606 may comprise a radio transmitter and receiver that operate at frequencies different from or using modulation different from the other interfaces. For example, the WLAN interface 602 may utilize frequencies in the 5.4 GHz and 5 GHz Industrial Scientific and Medicine (ISM) bands, while the PAN interface 604 may utilize the 5.4 GHz ISM bands. The secondary RF link interface 606 may comprise a radio transmitter that operates in the 900 MHz ISM band, within a licensed band at another frequency, and so forth. The secondary RF link interface 606 may be utilized to provide backup communication between the AMD 104 and other devices in the event that communication fails using one or more of the WLAN interface 602 or the PAN interface 604. For example, in the event the AMD 104 travels to an area within the physical space 102 that does not have Wi-Fi coverage, the AMD 104 may use the secondary RF link interface 606 to communicate with another device such as a specialized access point, docking station, or other AMD 104.

The other 608 network interfaces may include other equipment to send or receive data using other wavelengths or phenomena. For example, the other 608 network interface may include an ultrasonic transceiver used to send data as ultrasonic sounds, a visible light system that communicates by modulating a visible light source such as a light-emitting diode, and so forth. In another example, the other 608 network interface may comprise a wireless wide area network (WWAN) interface or a wireless cellular data network interface. Continuing the example, the other 608 network interface may be compliant with at least a portion of the 4G, 5G, 6G, LTE, or other standards.

The AMD 104 may include one or more of the following sensors 516. The sensors 516 depicted here are provided by way of illustration and not necessarily as a limitation. It is understood that other sensors 516 may be included or utilized by the AMD 104, while some sensors 516 may be omitted in some configurations.

A motor encoder 610 provides information indicative of the rotation or linear extension of a motor 680. The motor 680 may comprise a rotary motor, or a linear actuator. In some implementations, the motor encoder 610 may comprise a separate assembly such as a photodiode and encoder wheel that is affixed to the motor 680. In other implementations, the motor encoder 610 may comprise circuitry configured to drive the motor 680. For example, the autonomous navigation module 530 may utilize the data from the motor encoder 610 to estimate a distance traveled.

A suspension weight sensor 612 provides information indicative of the weight of the AMD 104 on the suspension system for one or more of the wheels or the caster. For example, the suspension weight sensor 612 may comprise a switch, strain gauge, load cell, photodetector, or other sensing element that is used to determine whether weight is applied to a particular wheel, or whether weight has been removed from the wheel. In some implementations, the suspension weight sensor 612 may provide binary data such as a "1" value indicating that there is a weight applied to the wheel, while a "0" value indicates that there is no weight applied to the wheel. In other implementations, the suspension weight sensor 612 may provide an indication such as so many kilograms of force or newtons of force. The suspension weight sensor 612 may be affixed to one or more of the wheels or the caster.

One or more bumper switches 614 provide an indication of physical contact between an object and a bumper or other member that is in mechanical contact with the bumper switch 614. The safety module 528 utilizes sensor data 542 obtained by the bumper switches 614 to modify the operation of the AMD 104. For example, if the bumper switch 614 associated with a front of the AMD 104 is triggered, the safety module 528 may drive the AMD 104 backwards.

A floor optical motion sensor (FOMS) 616 provides information indicative of motion of the AMD 104 relative to the floor or other surface underneath the AMD 104. In one implementation, the FOMS 616 may comprise a light source such as a light-emitting diode (LED), an array of photodiodes, and so forth. In some implementations, the FOMS 616 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 616 may provide other information, such as data indicative of a pattern present on the floor, composition of the floor, color of the floor, and so forth. For example, the FOMS 616 may utilize an optoelectronic sensor that may detect different colors or shades of gray, and this data may be used to generate floor characterization data. The floor characterization data may be used for navigation.

An ultrasonic sensor 618 utilizes sounds in excess of 50 kHz to determine a distance from the sensor 516 to an object. The ultrasonic sensor 618 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 618 may provide information indicative of a presence of an object, distance to the object, relative velocity, direction of movement, and so forth. Two or more ultrasonic sensors 618 may be utilized in conjunction with one another to determine a location within a two-dimensional plane of the object.

In some implementations, the ultrasonic sensor 618 or a portion thereof may be used to provide other functionality. For example, the emitter of the ultrasonic sensor 618 may be used to transmit data and the detector may be used to receive data transmitted that is ultrasonic sound. In another example, the emitter of an ultrasonic sensor 618 may be set to a particular frequency and used to generate a particular waveform such as a sawtooth pattern to provide a signal that is audible to an animal, such as a dog or a cat.

An optical sensor 620 may provide sensor data 542 indicative of one or more of a presence or absence of an object, a distance to the object, or characteristics of the object. The optical sensor 620 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 620 may utilize one or more sensing elements. For example, the optical sensor 620 may comprise a 4×4 array of light sensing elements. Each individual sensing element may be associated with a field of view (FOV) 118 that is directed in a different way. For example, the optical sensor 620 may have four light sensing elements, each associated with a different 100 FOV, allowing the sensor to have an overall FOV of 40°.

In another implementation, a structured light pattern may be provided by the optical emitter. A portion of the structured light pattern may then be detected on the object using a sensor 516 such as an image sensor or camera 106. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 620 may operate as a depth camera, providing a two-dimensional image of a scene, as well as data that indicates a distance to each pixel.

Data from the optical sensors 620 may be utilized for collision avoidance. For example, the safety module 528 and the autonomous navigation module 530 may utilize the sensor data 542 indicative of the distance to an object in order to prevent a collision with that object.

Multiple optical sensors 620 may be operated such that their FOV overlap at least partially. To minimize or eliminate interference, the optical sensors 620 may selectively control one or more of the timing, modulation, or frequency of the light emitted. For example, a first optical sensor 620 may emit light modulated at 60 kHz while a second optical sensor 620 emits light modulated at 63 kHz.

A lidar 622 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 542 may be generated that is indicative of the presence of objects and the relative positions, shapes, relative velocity, direction of movement, and so forth that are visible to the lidar 622. Data from the lidar 622 may be used by various modules. For example, the autonomous navigation module 530 may utilize point cloud data generated by the lidar 622 for localization of the AMD 104 within the physical space 102.

The AMD 104 may include a mast. For example, a light 682 may be mounted on the mast. A mast position sensor 624 provides information indicative of a position of the mast of the AMD 104. For example, the mast position sensor 624 may comprise limit switches associated with the mast extension mechanism that indicate whether the mast is at an extended or retracted position. In other implementations, the mast position sensor 624 may comprise an optical code on at least a portion of the mast that is then interrogated by an optical emitter and a photodetector to determine the distance to which the mast is extended. In another implementation, the mast position sensor 624 may comprise an encoder wheel that is attached to a mast motor that is used to raise or lower the mast. The mast position sensor 624 may provide data to the safety module 528. For example, if the AMD 104 is preparing to move, data from the mast position sensor 624 may be checked to determine if the mast is retracted, and if not, the mast may be retracted prior to beginning movement.

A mast strain sensor 626 provides information indicative of a strain on the mast with respect to the remainder of the AMD 104. For example, the mast strain sensor 626 may comprise a strain gauge or load cell that measures a sideload applied to the mast or a weight on the mast or downward pressure on the mast. The safety module 528 may utilize sensor data 542 obtained by the mast strain sensor 626. For example, if the strain applied to the mast exceeds a threshold amount, the safety module 528 may direct an audible and visible alarm to be presented by the AMD 104.

The AMD 104 may include a modular payload bay. A payload weight sensor 628 provides information indicative of the weight associated with the modular payload bay. The payload weight sensor 628 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 628 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 628 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 528 may utilize the payload weight sensor 628 to determine if the modular payload bay has been overloaded. If so, an alert or notification may be issued.

One or more device temperature sensors 630 may be utilized by the AMD 104. The device temperature sensors 630 provide temperature data of one or more components within the AMD 104. For example, a device temperature sensor 630 may indicate a temperature of one or more the batteries 502, one or more motors 680, and so forth. In the event the temperature exceeds a threshold value, the component associated with that device temperature sensor 630 may be shut down.

One or more interlock sensors 632 may provide data to the safety module 528 or other circuitry that prevents the AMD 104 from operating in an unsafe condition. For example, the interlock sensors 632 may comprise switches that indicate whether an access panel is open. The interlock sensors 632 may be configured to inhibit operation of the AMD 104 until the interlock switch indicates a safe condition is present.

An inertial measurement unit (IMU) 634 may include a plurality of gyroscopes 636 and accelerometers 638 arranged along different axes. The gyroscope 636 may provide information indicative of rotation of an object affixed thereto. For example, a gyroscope 636 may generate sensor data 542 that is indicative of a change in orientation of the AMD 104 or a portion thereof.

The accelerometer 638 provides information indicative of a direction and magnitude of an imposed acceleration. Data such as rate of change, determination of changes in direction, speed, and so forth may be determined using the accelerometer 638. The accelerometer 638 may comprise mechanical, optical, micro-electromechanical, or other devices. For example, the gyroscope 636 in the accelerometer 638 may comprise a prepackaged solid-state unit.

A magnetometer 640 may be used to determine an orientation by measuring ambient magnetic fields, such as the terrestrial magnetic field. For example, the magnetometer 640 may comprise a Hall effect transistor that provides output compass data indicative of a magnetic heading.

The AMD 104 may include one or more location sensors 642. The location sensors 642 may comprise an optical, radio, or other navigational system such as a global positioning system (GPS) receiver. For indoor operation, the location sensors 642 may comprise indoor position systems, such as using Wi-Fi Positioning Systems (WPS). The location sensors 642 may provide information indicative of a relative location, such as "living room" or an absolute location such as particular coordinates indicative of latitude and longitude, or displacement with respect to a predefined origin.

A photodetector 644 provides sensor data 542 indicative of impinging light. For example, the photodetector 644 may provide data indicative of a color, intensity, duration, and so forth.

A camera 106 generates sensor data 542 indicative of one or more images. The camera 106 may be configured to detect light in one or more wavelengths including, but not limited to, terahertz, infrared, visible, ultraviolet, and so forth. For example, an infrared camera 106 may be sensitive to wavelengths between approximately 700 nanometers and 1 millimeter. The camera 106 may comprise charge coupled devices (CCD), complementary metal oxide semiconductor (CMOS) devices, microbolometers, and so forth. The AMD 104 may use image data 122 acquired by the camera 106 for object recognition, navigation, collision avoidance, user communication, and so forth. For example, a pair of cameras 106 mounted on the AMD 104 to provide binocular stereo vision, with the sensor data 542 comprising images being sent to the identification module 120, the autonomous navigation module 530, and so forth. In another example, the camera 106 may comprise a 10 megapixel or greater camera that is used for videoconferencing or for acquiring pictures for the user 108.

One or more microphones 646 may be configured to acquire information indicative of sound present in the physical space 102. In some implementations, arrays of microphones 646 may be used. These arrays may implement beamforming techniques to provide for directionality of gain. The AMD 104 may use the one or more microphones 646 to acquire information from acoustic tags, accept voice input from users 108, determine a direction of an utterance, determine ambient noise levels, for voice communication with another user 108 or system, and so forth.

An air pressure sensor 648 may provide information indicative of an ambient atmospheric pressure or changes in ambient atmospheric pressure. For example, the air pressure sensor 648 may provide information indicative of changes in air pressure due to opening and closing of doors, weather events, and so forth.

An air quality sensor 650 may provide information indicative of one or more attributes of the ambient atmosphere. For example, the air quality sensor 650 may include one or more chemical sensing elements to detect the presence of carbon monoxide, carbon dioxide, ozone, and so forth. In another example, the air quality sensor 650 may comprise one or more elements to detect particulate matter in the air, such as the photoelectric detector, ionization chamber, and so forth. In another example, the air quality sensor 650 may include a hygrometer that provides information indicative of relative humidity.

An ambient light sensor 652 may comprise one or more photodetectors or other light-sensitive elements that are used to determine one or more of the color, intensity, or duration of ambient lighting around the AMD 104.

An ambient temperature sensor 654 provides information indicative of the temperature of the ambient physical space 102 proximate to the AMD 104. In some implementations, an infrared temperature sensor may be utilized to determine the temperature of another object at a distance.

A floor analysis sensor 656 may include one or more components that are used to generate at least a portion of floor characterization data. In one implementation, the floor analysis sensor 656 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 656 may be used by one or more of the safety module 528, the autonomous navigation module 530, the task module 532, and so forth. For example, if the floor analysis sensor 656 determines that the floor is wet, the safety module 528 may decrease the speed of the AMD 104 and generate a notification alerting the user 108.

The floor analysis sensor 656 may include other components as well. For example, a coefficient of friction sensor may comprise a probe that comes into contact with the surface and determines the coefficient of friction between the probe and the floor.

A caster rotation sensor 658 provides data indicative of one or more of a direction of orientation, angular velocity, linear speed of the caster, and so forth. For example, the caster rotation sensor 658 may comprise an optical encoder and corresponding target that is able to determine that the caster transitioned from an angle of 0° at a first time to 49° at a second time.

The sensors 516 may include a radar 660. The radar 660 may be used to provide information as to a distance, lateral position, relative velocity, and so forth, to an object. For example, the radar 660 may determine the distance to an object, such as a person.

The sensors 516 may include a passive infrared (PIR) sensor 662. The PIR 662 sensor may be used to detect the presence of users 108, pets, hotspots, and so forth. For example, the PIR sensor 662 may be configured to detect infrared radiation with wavelengths between 8 and 14 micrometers.

The AMD 104 may include other sensors 664 as well. For example, a capacitive proximity sensor may be used to provide proximity data to adjacent objects. Other sensors 664 may include radio frequency identification (RFID) readers, near field communication (NFC) systems, coded aperture cameras, and so forth. For example, NFC tags may be placed at various points within the physical space 102 to provide landmarks for the autonomous navigation module 530. One or more touch sensors may be utilized to determine contact with a user 108 or other objects.

The AMD 104 may include one or more output devices 518. A motor 680 may be used to provide linear or rotary motion. For example, one or more motors 680 may be used to move the AMD 104 from one location to another. In another example, one or more motors 680 may move the display device 686 with respect to a chassis of the AMD 104.

A light 682 may be used to emit photons. For example, the light 682 may comprise a light emitting diode (LED), electroluminescent device, a quantum dot, laser, incandescent bulb, fluorescent tube, and so forth.

A speaker 684 may be used to emit sound.

The display device 686 may comprise one or more of a liquid crystal display, light emitting diode display, electrophoretic display, cholesteric liquid crystal display, interferometric display, and so forth. The display device 686 may include a backlight or a frontlight. The display device 686 may be used to present visible information such as graphics, pictures, text, and so forth. For example, the display device 686 may comprise an array of light emitting components, such as LEDs. In some implementations, the display device 686 may comprise a touchscreen that combines a touch sensor and a display device 686.

In some implementations, the AMD 104 may be equipped with a projector 688. The projector 688 may be able to project an image on a surface, such as the floor, wall, ceiling, and so forth. In some implementations the projector 688 may be used to present the displayed image.

A scent dispenser 690 may be used to emit one or more smells. For example, the scent dispenser 690 may comprise a plurality of different scented liquids that may be evaporated or vaporized in a controlled fashion to release predetermined amounts of each.

One or more moveable component actuators 692 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 692 to produce movement of the moveable component.

In other implementations, other 694 output devices may be utilized. For example, the AMD 104 may include a haptic output device that provides output that produces particular touch sensations to the user 108. Continuing the example, a motor 680 with an eccentric weight may be used to create a buzz or vibration to allow the AMD 104 to simulate the purr of a cat.

FIG. 7 is a flow diagram 700 of a process for generating gallery data 162, according to some implementations. The process may be implemented at least in part by one or more of the processors 506 on the AMD 104, a docking station, one or more servers, or other devices.

At 702 a first image of a first person is determined at a first time. For example, the camera 106 may acquire image data 122 at a first time. The first image may comprise a first cropped image 126. The image data 122 may be processed by the user detection module 124 to determine the cropped images 126.

At 704 a first FV 152 of the first person as depicted in the first image is determined. For example, the cropped image 126 may be processed by the feature vector module 150 to determine a first FV 152 that is a candidate feature vector 152. In some implementations an internal identifier may be associated with the person in the cropped image 126. For example, the internal identifier may be associated with the person, but does not assert a particular identity to the person.

At 706 a first similarity value 156 that is indicative of a similarity between the first FV 152 and a previously included FV 152 in gallery data 162 is determined. For example, the similarity module 154 may be used to determine a set of similarity values 156 comparing the first FV 152 to individual ones of the previously included FVs 152 in the gallery data 162.

At 708 the first similarity value 156 is compared to a first threshold. If the first similarity value 156 is greater than the first threshold, the process proceeds to 710. For example, the first threshold may be indicative of a similarity value of 0.9.

At 710, the first FV 152 is disregarded. The comparison with the first threshold prevents redundant or duplicative FVs 152 that are substantially the same from being included in the gallery data 162. This significantly reduces the memory requirements associated with storing the gallery data 162. If the first similarity value 156 is less than the first threshold, the process proceeds to 712.

At 712 the first similarity value 156 is compared to a second threshold. The second threshold may have a value less than a value of the first threshold. If the first similarity value 156 is greater than the second threshold, the process proceeds to 714. For example, the second threshold may be indicative of a similarity value of 0.8.

At 714, the first FV 152 is included in the homogenous set 164 of the gallery data 162. The FVs 152 in the homogenous set 164 are similar to one another, but are not identical. If at 712 the first similarity value 156 is less than or equal to the second threshold, the process proceeds to 716. The first threshold and the second threshold describe a first range.

At 716, the first FV 152 is included in the diverse set 166 of the gallery data 162. In some implementations, storage in the diverse set 166 may be constrained using an additional comparison to determine that the similarity value 156 of FVs 152 in the diverse set 166 is greater than a third threshold value. This additional constraint may maintain a minimum level of diversity between FVs 152 in the diverse set 166.

As additional image data 122 is obtained and subsequent FVs 152 are generated, the gallery data 162 may be updated. The gallery data 162 may be constrained to a particular size. For example, each set of gallery data 162 for a given user 108 may be limited to 100 FVs 152 in the homogenous set 164 and 100 FVs 152 in the diverse set 166. As additional FVs 152 are generated, existing FVs 152 may be replaced, with newest FVs 152 replacing oldest FVs 152.

Figure 8:
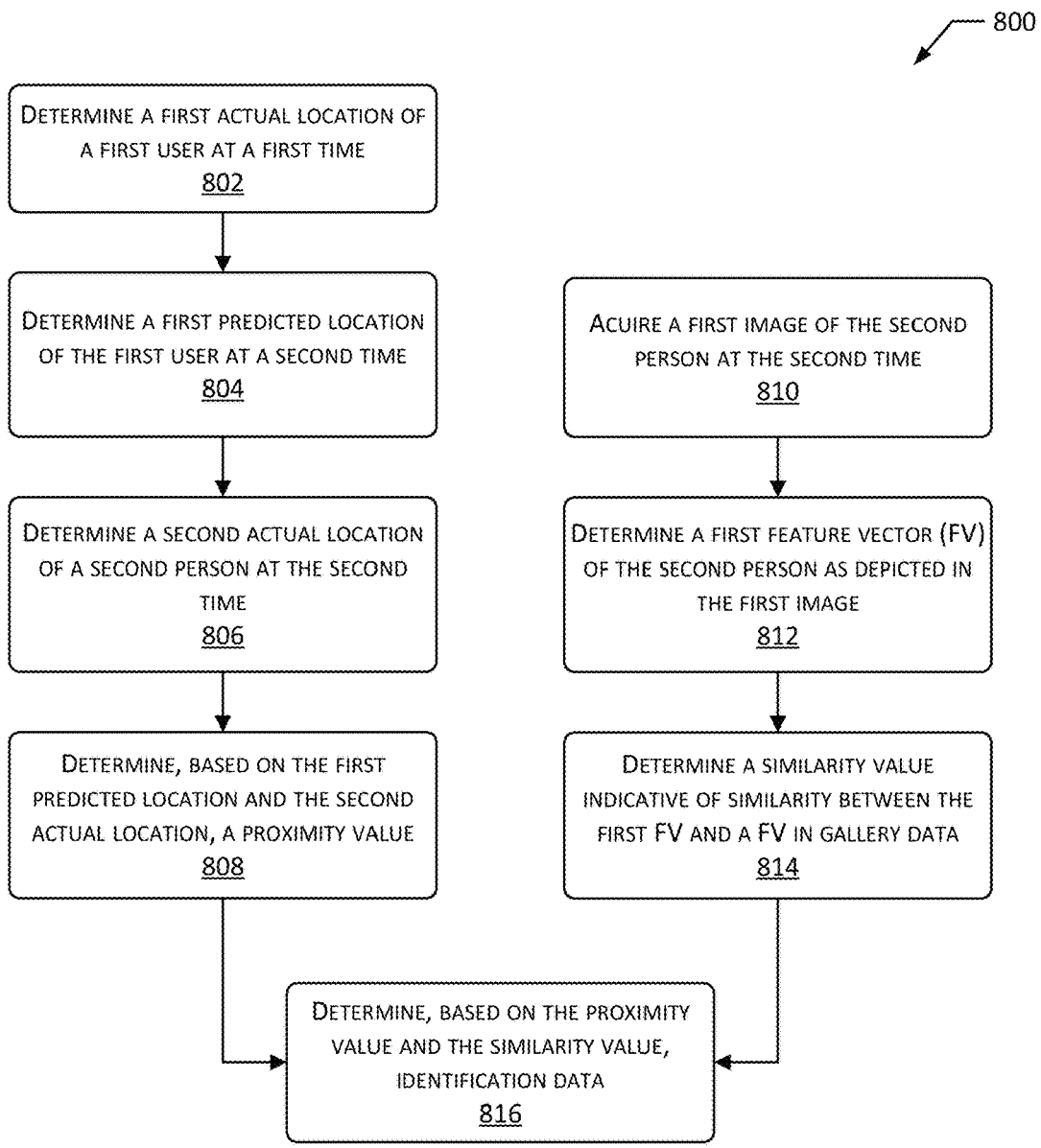
FIG. 8 is a flow diagram of a process for identifying a user, according to some implementations.

FIG. 8 is a flow diagram 800 of a process for identifying a user 108, according to some implementations. The process may be implemented at least in part by one or more of the processors 506 on the AMD 104, a docking station, one or more servers, or other devices.

At 802 a first location in physical space 130 of a first user 108 at a first time is determined. For example, the first location in physical space 130 of a previously identified first user 108 may be determined based on sensor data 542 acquired at the first time. The sensor data 542 may be acquired by sensors such one or more cameras 106, ultrasonic sensors 618, optical sensors 620, lidar 622, radar 660, and so forth.

At 804 a first predicted location 132 of the first user 108 at a second time is determined. For example, based on the first location in physical space data 130 from the first time, information indicative of a direction of travel, and an estimated velocity, the first predicted location 132 may be calculated. In some implementations Kalman filtering techniques may be used to determine the predicted location 132.

At 806 a second location in physical space 130 of a second person at the second time is determined. For example, the second location in physical space 130 may be determined based on sensor data 542 acquired at the second time.

At 808, based on the first predicted location 132 and the second location in physical space 130, a proximity value 136 is determined. In one implementation, the proximity value 136 may indicate a reciprocal or multiplicative inverse of a distance between the first predicted location 132 and the second location in physical space 130. In another implementation, the proximity value 136 may be determined based on a binning of the distance between the first predicted location 132 and the second location in physical space 130. For example, a distance between of 0 cm to 5 cm may be associated with a proximity value 136 of 0.95, a distance between of 5 cm to 10 cm may be associated with a proximity value 136 of 0.8, and so forth.

At 810, a first image of the second person at the second time is acquired. For example, the camera 106 may acquire image data 122 that is processed to determine a cropped image 126.

At 812 a first FV 152 of the second person as depicted in the first image is determined. For example, the cropped image 126 is processed by the feature vector module 150 to determine the first FV 152.

At 814 a similarity value 156 is determined that is indicative of a similarity between the first FV 152 and one or more FVs 152 in the gallery data 162. For example, the similarity module 154 may generate the similarity value 156.

At 816 identification data 170 is determined based on the proximity value 136 and the similarity value 156. For example, if the proximity value 136 is greater than a first threshold value, it may be indicative of the second person being the first user 108. Continuing the example, the similarity value 156 being greater than a second threshold value may indicate that the second person is the first user 108. By using both comparisons, identity may be asserted that the second person is the first user 108. The identification data 170 may include the user identifier 202 or other information that identifies the user 108 depicted in the image data 122 at the second time.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
a camera;
one or more non-transitory memories storing computer-executable instructions; and
one or more processors to execute the computer-executable instructions to:
acquire a first image at a first time using the camera;
determine that a first portion of the first image depicts a first person;
determine, using a first neural network, a first feature vector, wherein the first feature vector is representative of one or more features of the first person as depicted in the first image;

generate first gallery data associated with a first user identifier, wherein the first gallery data comprises the first feature vector that is associated with the first person;

acquire a second image at a second time using the camera;

determine that a second portion of the second image depicts a second person;

determine, using the first neural network, a second feature vector, wherein the second feature vector is representative of one or more features of the second person as depicted in the second image;

determine, based on the first feature vector and the second feature vector, a similarity value that is indicative of similarity between the first person and the second person; and determine, based at least in part on the similarity value exceeding a first threshold value, that the second person is associated with the first user identifier.

2. The AMD of claim 1, wherein the first neural network comprises:
a first plurality of convolution modules; and
a second plurality of attention modules, wherein each attention module:
receives input from a preceding convolution module,
generates, using the input, a weight map based on a spatial attention algorithm and a channel attention algorithm, and
sends output to a subsequent convolution module of the first plurality of convolution modules.

3. The AMD of claim 1, the one or more processors to execute the computer-executable instructions to:
acquire a third image at a third time using the camera;
determine that a third portion of the third image depicts a third person;
determine, using the first neural network, a third feature vector, wherein the third feature vector is representative of one or more features of the third person as depicted in the third image;
determine a first set of similarity values, wherein each similarity value of the first set is indicative of similarity between the third feature vector and each of the first feature vector and the second feature vector in the first gallery data;
determine that a greatest similarity value in the first set of similarity values is less than a second threshold value, wherein a similarity value less than the second threshold value is deemed indicative of a person other than the first person or the second person depicted in the first image and the second image; and
generate second gallery data associated with a second user identifier, wherein the second gallery data comprises the third feature vector that is associated with the third person.

4. The AMD of claim 1, the one or more processors to execute the computer-executable instructions to:
determine that the similarity value is less than a second threshold value; and
include the second feature vector in the first gallery data.

5. The AMD of claim 1, the one or more processors to execute the computer-executable instructions to:
determine, based on the first portion of the first image, estimated orientation information indicative of an orientation of the first person with respect to the camera; and
include the estimated orientation information in the first gallery data in association with the first feature vector.

6. The AMD of claim 1, the one or more processors to execute the computer-executable instructions to:
determine that an elapsed time since the first time has exceeded a second threshold value; and
delete the first gallery data.

7. The AMD of claim 1, the one or more processors to execute the computer-executable instructions to:
determine a first location in a physical space of the first person at the first time;
determine, based at least in part on the first location, a first predicted location in the physical space of the first person at the second time;
determine a second location in the physical space of the second person at the second time;
determine, based on the first predicted location and the second location, a proximity value; and
wherein the determination that the second person is associated with the first user identifier is based on the proximity value exceeding a second threshold value.

8. The AMD of claim 7, the instructions to determine the proximity value comprising one or more of:
determine a reciprocal of a distance between the first predicted location and the first location in the physical space.

9. The AMD of claim 1, the one or more processors to execute the computer-executable instructions to:
determine a first predicted location in a physical space of the first person at a third time;
determine a second predicted location in the physical space of the second person at the third time;
determine a first location in the physical space of a third person at the third time;
determine the first location is closest to the second predicted location;
acquire a third image at the third time using the camera;
determine, using the first neural network, a third feature vector, wherein the third feature vector is representative of one or more features of the third person as depicted in the third image;
determine a second similarity value that is indicative of a similarity of the third feature vector and one or more feature vectors in second gallery data; and
determine, based at least in part on the second similarity value exceeding a second threshold value, that the third person is the second person.

10. A method performed at least in part by an autonomous mobile device (AMD), the method comprising:
acquiring a first image at a first time;
determining that a first portion of the first image depicts a first person;
determining, using a first neural network, a first feature vector, wherein the first feature vector is representative of one or more features of the first person as depicted in the first image;
generating first gallery data associated with a first user identifier, wherein the first gallery data comprises the first feature vector that is associated with the first person;
acquiring a second image at a second time;
determining that a second portion of the second image depicts a second person;
determining, using the first neural network, a second feature vector, wherein the second feature vector is representative of one or more features of the second person as depicted in the second image;

determining, based on the first feature vector and the second feature vector, a similarity value that is indicative of similarity between the first person and the second person; and determining, based at least in part on the similarity value exceeding a first threshold value, that the second person is associated with the first user identifier.

11. The method of claim 10, further comprising:

acquiring a third image at a third time;

determining that a third portion of the third image depicts a third person;

determining, using the first neural network, a third feature vector, wherein the third feature vector is representative of one or more features of the third person as depicted in the third image;

determining a first set of similarity values, wherein each similarity value of the first set is indicative of similarity between the third feature vector and each of the first feature vector and the second feature vector in the first gallery data;

determining that a greatest similarity value in the first set of similarity values is less than a second threshold value, wherein a similarity value less than the second threshold value is deemed indicative of a person other than the first person or the second person depicted in the first image and the second image; and generating second gallery data associated with a second user identifier, wherein the second gallery data comprises the third feature vector that is associated with the third person.

12. The method of claim 10, further comprising:

determining the similarity value is greater than a second threshold value; and omitting the second feature vector from the first gallery data.

13. The method of claim 10, further comprising:

determining, based on the first portion of the first image, orientation data indicative of an orientation of the first person with respect to a camera used to acquire the first image; and including the orientation data in the first gallery data in association with the first feature vector.

14. The method of claim 10, further comprising:

determining a first location in a physical space of the first person at the first time;

determining, based at least in part on the first location, a first predicted location in the physical space of the first person at the second time;

determining a second location in the physical space of the second person at the second time;

determining, based on the first predicted location and the second location, a proximity value; and wherein the determining that the second person is associated with the first user identifier is based on the proximity value.

15. The method of claim 10, further comprising:

determining a first predicted location of the first person in a physical space at a third time;

determining a second predicted location in the physical space of the second person at the third time;

determining a first location in the physical space of a third person at the third time;

determining the first location is closest to the first predicted location;

acquiring a third image at the third time;

determining, using the first neural network, a third feature vector, wherein the third feature vector is representative of one or more features of the third person as depicted in the third image;

determining a second similarity value that is indicative of a similarity of the third feature vector and one or more feature vectors in second gallery data; and determining, based at least in part on the second similarity value exceeding a second threshold value, that the third person is the second person.

16. A method performed at least in part by an autonomous mobile device (AMD), the method comprising:

determining a first proximity value associated with a first user, wherein the first proximity value is indicative of correspondence between a first location in a physical space of the first user and a first predicted location in the physical space of the first user at a first time;

determining the first proximity value exceeds a first threshold value;

determining a first feature vector associated with a first image of a first person;

determining a first similarity value, wherein the first similarity value is indicative of similarity between the first feature vector and a previously stored second feature vector that is associated with the first user;

determining that the first similarity value exceeds a second threshold value; and generating identification data indicative of the first person being the first user.

17. The method of claim 16, further comprising:

determining the first similarity value is between a third threshold value and a fourth threshold value;

storing the first feature vector in a first set of feature vectors associated with the first user;

determining a third feature vector associated with the first user;

determining a second similarity value, wherein the second similarity value is indicative of similarity between the third feature vector and a previously stored fourth feature vector that is associated with the first user;

determining the second similarity value is between a fifth threshold value and the third threshold value, wherein the fifth threshold value is less than the third threshold value; and storing the third feature vector in a second set of feature vectors associated with the first user.

18. The method of claim 16, the determining the first feature vector comprising:

processing at least a portion of the first image using a neural network comprising:
  a first plurality of convolution modules to perform convolutional operations; and
  a second plurality of attention modules, wherein each attention module:
    receives input from a preceding convolution module,
    generates, using the input, a weight map based on a spatial attention algorithm and a channel attention algorithm, and
    sends output to a subsequent convolution module of the first plurality of convolution modules.

19. The method of claim 16, the determining the first proximity value comprising:

determining a distance between the first predicted location and the first location in the physical space.

20. The method of claim 16, further comprising:

generating gallery data associated with the first user, the gallery data comprising:

a first set of feature vectors having similarity values that are within a first range; and a second set of feature vectors having similarity values that are within a second range.

* * * * *